3,281,931
HIGH TEMPERATURE CERAMIC-METAL SEAL
Joseph W. Ritz, Little Silver, N.J., assignor to The Bendix Corporation, Eatontown, N.J., a corporation of Delaware
No Drawing. Filed Oct. 10, 1963, Ser. No. 315,337
2 Claims. (Cl. 29—473.1)

The present invention relates to ceramic-metal seals and more particularly to ceramic-metal seals for high temperatures.

In the production of a seal between a metal and a non-metal, such for example, as a metal and a ceramic, for most applications it is a requirement that the resulting seal have high physical strength, be vacuum-tight and be able to withstand very high temperatures. In the past, several methods of making such a seal have been devised, notable among which are the active metal coating method and the molybdenum-manganese metalizing methods.

Advances in technology have imposed new requirements on ceramic to metal seals. The necessity to withstand higher operating temperatures have made the active metal coated seals inadequate due to their low melting characteristics. Further, some applications require the use of alkali metal vapor in which it is necessary to have an extremely high purity of alumina ceramics to contain the same. This has increased the difficulty of bonding with molybdenum-manganese metalizing. The alkali metal vapors will attack silica, manganese and titanium which are frequently used as bond promoting additives with molybdenum metal powders in the metalizing mix.

The present invention provides a metallic coating which has good adhesion ability with silica-free, high alumina ceramic and provides a surface to which a metal member or another metalized ceramic can be bonded to make a vacuum-tight seal that will withstand extremely high temperatures, yet not be adversely affected by alkali metal vapors.

It is an object of the invention to provide an improved ceramic-metal seal.

Another object of the invention is to provide a novel method for making a ceramic-metal seal.

Another object of the invention is to provide a novel mixture for metalizing ceramics.

Another object of the invention is to provide an improved ceramic-metal seal that will withstand high temperatures.

A further object of the invention is to provide a ceramic-metal seal that is not adversely affected by alkali metal vapor.

The above and other objects and features of the invention will appear more fully hereinafter from a consideration of the following description.

In the preparation of a ceramic-metal seal a ceramic member is coated with a metalizing mixture on the area to be brazed. After coating, the member is then fired to sinter the mixture to the ceramic. The metalized ceramic may then be brazed with a metal member or another metalized ceramic to form the desired seal. While reference is made to a ceramic-metal seal, it is understood that the term also may include a ceramic to ceramic seal.

A novel feature of the present invention is the metalizing mixture which is a mixture of a refractory metal, such, for example, as tungsten, and a rare earth oxide, such as yttrium oxide ($Y_2O_3$). The proportion of the rare earth oxide can vary over a range of from 0.25 percent to 5 percent by weight of the total metal oxide combination. It is preferred that both components of the mix be in a finely divided state and be mixed with a vehicle for ease of application. The vehicle may be distilled water or a mixture of organic liquids.

In a specific example, a ceramic member was coated, by brushing, with a thin layer of a mixture of 2 percent of yttrium oxide by weight and 98 percent of tungsten powder by weight mixed with organic vehicles. The ceramic was then fired at a temperature of over 1450° C. in a reducing atmosphere. After the sintering operation, the ceramic was plated on the metalized area and then brazed to a metal member to form a vacuum-tight seal. The yttrium oxide and tungsten metal were in the form of a fine powder such as would go through a 325 mesh screen and where further reduced by milling in forming the mixture.

The metalized mixture may be applied to the area of the ceramic to be brazed by any suitable method, such, for example, as brushing, dipping, spraying or silk screening. Also, the percentages in the mix may be varied within the limits set forth above.

Although this invention has been described by means of an exemplary embodiment, it will be understood that it is not limited thereby but by the scope of the appended claims only.

What is claimed is:
1. A method of making a ceramic-metal seal which comprises coating a ceramic member with a thin layer of a mixture of 2% of yttrium oxide by weight and 98% of tungsten powder by weight, firing at a tempearture in excess of 1450° C. in a reducing oven, plating the metalized area, and brazing to a metal member to form a vacuum-tight seal.

2. A method of making a ceramic-metal seal which comprises coating a predetermined area of a ceramic body with a mixture in the following ranges: 5 to 0.25% yttrium oxide and 95 to 99.75% tungsten powder, firing said ceramic body at a temperature over 1450° C. to sinter said mixture with said ceramic body, plating said sintered area, and brazing to a metal member to form a vacuum-tight seal.

References Cited by the Examiner
UNITED STATES PATENTS

| | | | |
|---|---|---|---|
| 2,515,559 | 7/1950 | Lancaster et al. | 252—515 |
| 2,695,945 | 11/1954 | Conant | 252—515 |
| 2,776,472 | 1/1957 | Mesick | 29—473.1 |
| 3,006,069 | 10/1961 | Rhoades et al. | 29—473.1 |

JOHN F. CAMPBELL, *Primary Examiner.*